2,879,200

CERTAIN HIGHER ALKYL-SUBSTITUTED ALKYLENE POLYAMINE SALTS OF MERCAPTOBENZOTHIAZOLE AND USE AS FUNGICIDE AND BACTERICIDE

Milton Kosmin, Dayton, Ohio, assignor to Monsanto Chemical Company, St. Louis, Mo., a corporation of Delaware No Drawing. Application October 16, 1956
Serial No. 616,138

12 Claims. (Cl. 167—33)

The present invention relates to organic compounds of sulfur and nitrogen and more particularly provides certain new amine salts of 2-mercaptobenzothiazole, the method of preparing the same and fungicidal compositions comprising the new salts.

According to the invention there are provided N-hydrocarbon polyalkylenepolyamine salts of 2-mercaptobenzothiazole of the formula:

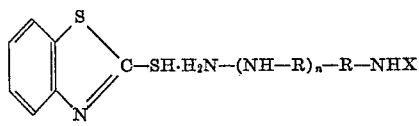

in which R is an alkylene radical of from 2 to 3 carbon atoms, $n$ is an integer of 0 to 2 and X is an aliphatic hydrocabon radical of from 8 to 18 carbon atoms.

The new salts are prepared by treating 2-mercaptobenzothiazole with a suitable N-hydrocarbon polyalkylenepolyamide. As examples of amines which are reacted with 2-mercaptobenzothiazole according to the invention to give the present salts may be mentioned the following: N-octyldiethylenetriamine, N-decyltripropylenetetramine, N - n - dodecyltriethylenetetramine, N-branched chain tetradecyldipropylenetriamine, N-hexadecyldiethylenetriamine, N - octadecylpropylenediamine, N - nonylethylenediamine, N - (2 - ethylhexyl)ethylenediamine, N - (2 - n - propylheptyl)dipropylenetriamine, N - (2,6,8 - trimethylnonyl)diethylenetriamine, N - keryltriethylenetetramine. (where keryl denotes the mixture of alkyl radicals corresponding to the hydrocarbons of kerosene), N-octenylpropylenediamine, N-decenyldiethylenetriamine, N-hexadecenyldiethylenetriamine, N-octadecenylethylenediamine, N - tetrapropenyldiethylenetriamine (prepared by the addition reaction of diethylenetriamine with the reaction product of propylene tetramer and hypochlorous acid), etc.

The present amine salts are well defined liquid to waxy or even crystalline compounds which differ essentially from the 2-mercaptobenzothiazole. They are generally soluble in water and the lower alkanols. As will be shown hereinafter the present amine salts are characterized by bacteriostatic and fungistatic properties. These effects are demonstrated when they are present in treating solutions in very small concentrations, e.g., in quantities of as low as say from 1 to 10 parts per million. At higher concentrations, say at a concentration of about 1%, herbicidal properties are demonstrated.

Conversion of the 2-mercaptobenzothiazole into the present amine salts is effected by simply adding the amine to the 2-mercaptobenzothiazole in the presence or absence of an inert diluent or solvent and allowing the resulting mixture to stand until the 2-mercaptobenzothiazole has been converted into the salt. The diluent or solvent, if one were uesd, may then be removed by distillation or by extracting the salt with water. Depending upon the ultimate use of the salt, it is often unnecessary to separate the solvent, the crude reaction mixture being useful directly in applications where the presence of a diluent is immaterial. Inert diluent or solvents useful in preparing the present amine salts are the lower aliphatic alcohols, e.g., ethanol and isopropanol, hydrocarbons such as benzene, kerosene, and hexane, etc.

Since formation of the salts occurs by addition of 1 mole of the N-hydrocarbon polyalkylenepolyamine to 1 mole of the 2-mercaptobenzothiazole, stoichiometric proportions of the 2-mercaptobenzothiazole and the amine are advantageously employed. However, an excess of either reactant may be employed since any unreacted amine or 2-mercaptobenzothiazole may be readily recovered from the reaction product.

The invention is further illustrated but not limited by the following examples:

*Example 1*

This example shows preparation of a N-dodecyldiethylenetriamine salt of 2 - mercaptobenzothiazole. The amine used was a N-keryldiethylenetriamine which had been obtained by condensing with diethylenetriamine a substantially mono-chlorinated kerosene fraction (57.4% chlorinated on a molar basis, and prepared from an unchlorinated kerosene fraction boiling at about 150–250° C.).

25.2 g. (0.15 mole) of 2-mercaptobenzothiazole was dispersed in 200 ml. of ethanol, and into the dispersion there was added 42.5 g. (0.15 mole, based on the keryl radical as $C_{12}$ of the N-keryldiethylenetriamine. Some heat was generated. The mixture was then allowed to cool and then submitted to distillation under partial pressure in order to remove the ethanol. The residue, a viscous liquid, comprised the substantially pure N-keryldiethylenetriamine salt of 2-mercaptobenzothiazole.

*Example 2*

This example shows testing of the N-keryldiethylenetriamine salt of 2-mercaptobenzothiazole which was prepared in Example 1 against the fungi *Stemphylium sarcinaeforme* and *Monilinia fructicola*. Respective suspensions of the organisms were prepared from 5-day old cultures thereof on slants of agar cultures by removing said spores with a rubber policeman from the slant and suspending them in distilled water. The concentration of spores was adjusted to about 40,000 per ml. of water.

The 2-mercaptobenzothiazole salt of Example 1 was added to water in a concentration calculated to give 1,000 parts of the compound per million parts of water. An 0.22 ml. aliquot of the resulting solution was pipetted into wells of two depressed glass slides and allowed to evaporate to dryness. Then a 0.1 ml. aliquot of each of the above spore suspensions was respectively pipetted into each well. The concentration of the 2-mercaptobenzothiazole salt in each well was thus lowered to 200 parts per million of diluent. Two "blanks" were also prepared by pipetting respectively 0.1 ml. aliquots of the abov spore suspensions into empty wells of two depresesd glass slides. All of the slides weer then incubated in a moist chamber for 16 hours at 25° C. Inspection of the slides at the end of this time showed no germination of either the *Stemphylium sarcinaeforme* or the *Monilinia fructicola* spores in the presence of the salt, i.e., on the slides on which the N-keryldiethylenetriamine salt of 2-mercaptobenzothiazole had been deposited; whereas there was profuse spore germination on the "blanks."

*Example 3*

This example shows evaluation of the 2-mercaptobenzothiazole N-keryldiethylenetriamine salt of Example 1 as a systemic fungicide in the control of tomato wilt.

Three two-week old Bonny Best tomato seedlings were immersed into water containing 10 parts per million of the test compound. After 48 hours the seedlings were removed and the root systems were rinsed thoroughly in tap water to remove any chemical residue. Approximately ⅓ of each lateral root system of each plant was severed and the wounded roots were dipped for 30 seconds in a bud-cell suspension of *Fusarium oxysporum* f. *lycopersici*. The thus inoculated plants were then potted in 4-inch clay pots of steamed-soil. "Blanks" were prepared by similarly inoculating and potting tomato seedlings which had not been exposed to the salt. The potted plants were then set in the greenhouse for observation.

Marked Fusarium wilt symptoms were noted on the "blanks," whereas the plants which had been treated with amine salt appeared to be in excellent condition. At this time disease incidence in the plants which had been immersed in the 2-mercaptobenzothiazole N-keryldiethylenetriamine salt was investigated by cross-sectioning the stem of each of the treated and inoculated plants and examining them for vascular browning. No vascular discoloration was noted. Similar examination of the "blanks" showed pronounced browning.

*Example 4*

This example shows further testing of the N-keryldiethylenetriamine salt of 2-mercaptobenzothiazole which was prepared in Example 1. Ten-fold serial dilutions of the salt ranging from 1:1,000 through 1:1,000,000 were prepared in agar and inoculated with various test fungi. After a 15 day incubation period at 25° C. the inoculated plates of agar were examined for presence or absence of growth of each testing organism.

It was found that at a 100 p.p.m. concentration the salt completely inhibited the growth of *Fomes, annosus, Ceratostomella pilifera, Cladosporium herbarum, Stemphylium sarcinaeforme* and *Monilinia fructicola*. At 10 p.p.m. the growth of *Chaetomium globosum* was completely inhibited. The organism *Tricophyton mentagrophytes* was completely inhibited at a concentration of 1 p.p.m. of the salt.

*Example 5*

The 2-mercaptobenzothiazole N-keryldiethylenetriamine salt of Example 1 was evaluated as a bacteriostat by inoculating with various test organisms plates of nutrient agar containing varying concentrations of the salt. After incubating the inoculated plates at 25° C. for 15 days they were examined for presence or absence of bacterial growth. It was found that at a concentration of 100 p.p.m. the growth of the following was completely inhibited: *Micrococcus pyogenes* var. *aureus, Streptococcus faecalis, Bacillus cereus* var. *mycoides, Bacillus subtilis, Escherichia coli, Aerobacter aerogenes, Erwinia atroseptica* and *Salmonella typhosa*. At 10 p.p.m. there was complete inhibition of the growth of *Cornyebacterium diphtheriae, Bacterium ammoniagenes,* and *Mycobacterium phlei*.

Salts of 2-mercaptobenzothiazole with other N-hydrocarbon polyalkylenepolyamines of the present invention are likewise efficient against fungi and bacteria. The salt of 2-mercaptobenzothiazole and N-(tetrapropylene)diethylenetriamine or the salt of 2-mercaptobenzothiazole and N-n-dodecyl or N-octyltriethylenetetramine possess pronounced biological effect. As herein disclosed said salts are readily obtainable by simply mixing the 2-mercaptobenzothiazole with the appropriate N-alkylpolyalkylenepolyamine in the presence or absence of an inert diluent.

The present salts are highly efficient for preventing or retarding fungus growth on plants, fruits, seeds, soils, furs, leather, cotton, wood and organic material in general. They may be applied directly to the organic material which is to be treated, but because the present salts are effective in extremely dilute concentrations, it is preferred to incorporate the present agents with a carrier or a diluent. Aqueous solutions of the salts may be employed in the absence of any dispersant; however, for many purposes the addition of a dispersing agent is preferred in that better adhesion or penetration of the treating solution is obtained. As dispersing agents there may be used, e.g., alkali metal salts of higher alkyl sulfosuccinates, the higher alkylbenzenesulfonates, polyalkylene glycol ethers of long chained alcohols, etc.

Fungistatic or bacteriostatic dusts may be prepared by mixing the present salts with dusting materials such as talc, clay, lime, bentonite, pumice, fuller's earth, etc.

The present salts are soluble in the usual organic solvents and may be used as solutions, e.g., in ethanol solution, as fungicidal or bactericidal sprays.

Fungicidal and bactericidal compositions comprising the present N-hydrocarbon polyalkylenepolyamine salts of 2-mercaptobenzothiazole may be applied only to the surface of the material to be treated as when treating foliage, furs, leather and other comparatively impregnable material upon which fungus growth is to be prevented or retarded. In other cases, for example, when it is desired to protect seeds from soil microorganisms harmful to the seeds and plants, the present salts, preferably incorporated with a solid carrier, may be mixed with the seed. For protection of fruit, seeds, plant tubers, etc., during storage, it may be advantageous to effect the treatment by employing aqueous solutions of the present salts together with a dispersing agent. Impregnation of textiles with the salts is also advantageously effected by immersion in solutions of these compounds in the presence or absence of a wetting-out agent.

What I claim is:

1. A 2-mercaptobenzothiazole salt of the formula:

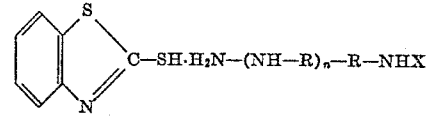

in which R is an alkylene radical of from 2 to 3 carbon atoms, $n$ is an integer of 0 to 2 and X is an aliphatic hydrocarbon radical of 12 carbon atoms.

2. The N-keryldiethylenetriamine salt of 2-mercaptobenzothiazole, said keryl radical denoting the mixture of alkyl radicals corresponding to the hydrocarbons of kerosene.

3. A composition effective against fungi and bacteria which comprises an inert carrier and as the essential effective ingredient a salt of the formula:

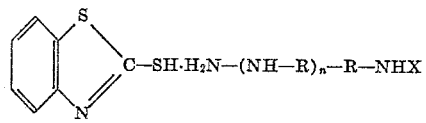

in which R is an alkylene radical of from 2 to 3 carbon atoms, $n$ is an integer of 0 to 2 and X is an aliphatic hydrocarbon radical of 12 carbon atoms.

4. A composition effective against fungi which comprises an inert carrier and as the essential effective ingredient a salt of the formula:

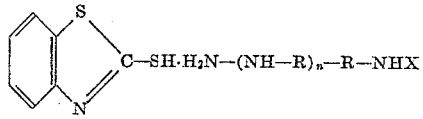

in which R is an alkylene radical of from 2 to 3 carbon atoms, $n$ is an integer of 0 to 2 and X is an aliphatic hydrocarbon radical of 12 carbon atoms.

5. A composition effective against bacteria which comprises an inert carrier and as the essential effective ingredient a salt of the formula:

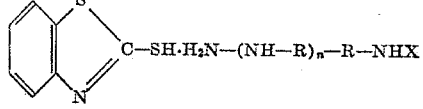

in which R is an alkylene radical of from 2 to 3 carbon atoms, *n* is an integer of 0 to 2 and X is an aliphatic hydrocarbon radical of 12 carbon atoms.

6. A composition effective against fungi and bacteria which comprises an inert carrier and as the essential effective ingredient the salt of 2-mercaptobenzothiazole and N-keryldiethylenetriamine wherein the keryl radical denotes a mixture of alkyl radicals corresponding to the hydrocarbons of kerosene.

7. A composition effective against fungi which comprises an inert carrier and as the essential effective ingredient the salt of 2-mercaptobenzothiazole and N-keryldiethylenetriamine wherein the keryl radical denotes a mixture of alkyl radicals corresponding to the hydrocarbons of kerosene.

8. A composition effective against bacteria which comprises an inert carrier and as the essential effective ingredient the salt of 2-mercaptobenzothiazole and N-keryldiethylenetriamine wherein the keryl radical denotes a mixture of alkyl radicals corresponding to the hydrocarbons of kerosene.

9. The method of combatting fungi and bacteria which comprises exposing said fungi and bacteria to a composition comprising a toxic quantity of a 2-mercaptobenzothiazole salt of the formula:

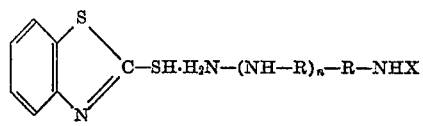

in which R is an alkylene radical of from 2 to 3 carbon atoms, *n* is an integer of 0 to 2 and X is an aliphatic hydrocarbon radical of 12 carbon atoms.

10. The method of combatting fungi which comprises exposing said fungi to a toxic quantity of a 2-mercaptobenzothiazole salt of the formula:

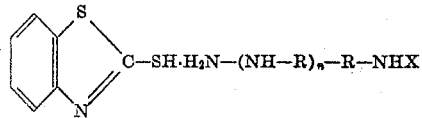

in which R is an alkylene radical of from 2 to 3 carbon atoms, *n* is an integer of 0 to 2 and X is an aliphatic hydrocarbon radical of 12 carbon atoms.

11. The method of combatting bacteria which comprises exposing said bacteria to a toxic quantity of a 2-mercaptobenzothiazole salt of the formula:

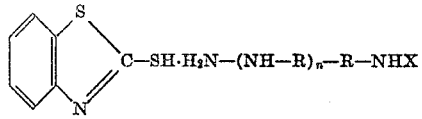

in which R is an alkylene radical of from 2 to 3 carbon atoms, *n* is an integer of 0 to 2 and X is an aliphatic hydrocarbon radical of 12 carbon atoms.

12. The method of combatting fungi which comprises exposing said fungi to a toxic quantity of the salt of 2-mercaptobenzothiazole and N-keryldiethylenetriamine wherein the keryl radical denotes the mixture of alkyl radicals corresponding to the hydrocarbons of kerosene.

References Cited in the file of this patent

UNITED STATES PATENTS

| | | |
|---|---|---|
| 2,024,605 | Sebrell | Dec. 17, 1935 |
| 2,437,170 | Minich | Mar. 2, 1948 |

UNITED STATES PATENT OFFICE
CERTIFICATE OF CORRECTION

Patent No. 2,879,200            March 24, 1959

Milton Kosmin

It is hereby certified that error appears in the printed specification of the above numbered patent requiring correction and that the said Letters Patent should read as corrected below.

Column 2, line 50, for "0.22" read -- 0.02 --.

Signed and sealed this 11th day of April 1961.

(SEAL)
Attest:
ERNEST W. SWIDER

Attesting Officer

ARTHUR W. CROCKER
Acting Commissioner of Patents